United States Patent [19]
Gould

[11] Patent Number: 4,991,618
[45] Date of Patent: Feb. 12, 1991

[54] AIR PRESSURE INDICATION AND CONTROL SYSTEM FOR A TIRE STEM AIR VALVE

[76] Inventor: Sheldon D. Gould, 3601 NE. 170th St., North Miami Beach, Fla. 33160-3149

[21] Appl. No.: 376,030

[22] Filed: Jul. 6, 1989

[51] Int. Cl.⁵ ............................................. F16K 15/20
[52] U.S. Cl. ..................................... 137/225; 137/227; 137/505.25; 137/613; 152/427
[58] Field of Search .................... 137/225, 227, 505.25, 137/613; 152/427

[56] References Cited

U.S. PATENT DOCUMENTS

| | | | |
|---|---|---|---|
| 1,308,037 | 7/1919 | Buchek | 137/225 |
| 1,482,947 | 2/1924 | Shorts | 137/227 |
| 1,503,759 | 8/1924 | Kraft et al. | 137/225 |
| 1,582,523 | 4/1926 | Larson et al. | 137/227 |
| 1,873,303 | 8/1932 | De Langie | 137/225 |
| 2,024,780 | 12/1935 | Ruckman | 137/225 |
| 2,510,052 | 6/1950 | Navarro et al. | 137/225 |
| 3,451,418 | 6/1969 | Nakagawa et al. | 137/227 |
| 3,738,308 | 6/1973 | Barabino | 137/227 X |
| 3,911,988 | 10/1975 | Richards | 137/505.25 X |
| 4,310,014 | 6/1982 | Parker | 137/227 |

Primary Examiner—John Rivell
Attorney, Agent, or Firm—Melvin K. Silverman

[57] ABSTRACT

A tire valve incorporates a visual gauge, an element for setting different air pressures. The valve cannot overinflate, as the valve locks at a maximum pressure. Further, an indicator actuates when underinflated, and the valve is designed to keep pressure for an indefinite period.

11 Claims, 5 Drawing Sheets

AIR PRESSURE INDICATION AND CONTROL SYSTEM FOR A TIRE STEM AIR VALVE

BACKGROUND OF THE INVENTION

The present invention relates to a tire pressure indicator and, in particular, to such an indicator in combination with a tire stem valve.

For the maintaining of tire vehicles at a pressure which provides economical vehicle operation and satisfactory vehicle ride quality, it is desirable to determine the need for tire pressure adjustment when such need arises. Commonly, a tire pressure gauge is manually applied to each tire valve stem to provide a measure of tire pressure. It has also been proposed to provide various, structures permanently mounted either in the tire, in combination with the valve stem, or separately therefrom, for the providing of an indication of tire overpressure or of underpressure, as the case may be.

It has been found that overinflation is a common problem at service station air pumps. When fully inflated my valve will lock and at no time can you overinflate the tire.

Pressure measuring structures can be very useful, and, as such, it is a general concern of this invention to make improvements in such structures to enhance the reliability and readability of indicators which are combined with a tire stem and which address problems of tire underpressure (causing wear of the outer tire edges and the generation of heat) and tire overpressure (which causes excessive wear in the center groove area and renders the tire more susceptible to damage from objects on the road). Wheel axis mis-alignment also results from unequal pressures in the respective tires.

The present invention is also concerned with tire pressure compensation means, such as in the use of an integrated pressurized fluid capsule, in association with the basic structure of the invention. This feature addresses the prblem of tire pressure compensation due both to tire rotation and unexpected tire deflation.

The prior art, as is known to the inventor, is best reflected in U.S. Pat. No. 3,670,688 (1972) to Seaberg, entitled Composite Valve Stem; U.S. Pat. No. 4,3310,014 (1982) to Parker, entitled Tire Pressure indicator integral with Tire System; U.S. Pat. No. 4,557,308 (1985) to Kuypres, entitled Tire Valve and Low Pressure Indicator. The structures reflected in said patents and in other part, do not provide the simplicity of operation and as economy viability that is reflected in my invention as set forth below.

SUMMARY OF THE INVENTION

The present invention relates to an air pressure control system for a tire stem air valve of a vehicle. The system, more particularly, includes a hollow elongated axisymmetric stem having an outer end and an inner end, the stem having a radially extending stop near said outer end thereof.

Further included in the system, and secured within said outer end of said stem is an outer tire stem valve which is open in the presence of pressure at its input and is closed in the absence of pressure at its input. The system also includes an inner tire stem valve secured withing said inner end of said stem and having its axis inverted relative to the axis of said outer tire stem, the valve input of said inner valve being at said inner end of said stem, said input and outlet being axially moveable relative to said inner valve. The system also includes a hollow axisymmetric skirt having a central longitudinal bore said skirt having an inner end and an outer end, said inner end of said stem secured to said outer end of said skirt, co-axially with the bore thereof. The system further includes an axisymmetric hollow base assembly having the same axis of symmetry as said stem and said skirt, said base assembly including a circumferential diaphragm disposed at a radius from the axis of the base assembly. At an inner end of said base assembly is a base having apertures for communication with the inside of said tire, said base further having an axial protrusion extending outwardly and into the axis of said skirt, said base assembly being in fluid-tight communication with said inner end of said skirt. The system yet further includes an inner spring having an inner end and outer end, said inner end positioned upon said axial protrusion of said base assembly and upon the mutual axis of said skirt and stem, said outer end of said spring urging against said input of said inner tire stem valve, thereby keeping said inner stem valve open when said inner spring is compressed and, conversely, closing said inner stem valve when said inner spring is not compressed, this occurring when the tire pressure reaches a level sufficient to expand said inner spring to a non-compressed state, thus defining a maxiumum tire pressure permitted by the system. The system further includes a hollow axisymmetric shell within which said skirt is slideably positioned, said skirt having an outer radial base of said shell. Resultingly, decreases in the level of tire pressure will be reflected by expansion of said outer spring a resultant inward advance of said stem and skirt. The maximum of such inward advance is defined by said radial stop of said stem, and is thereby indicative to the user of an unsafe low level of tire pressure.

It is accordingly an object of the present invention to provide a tire pressure indicator system that is integral with the tire stem and which will provide to the user assurance against underinflation of the tires, and at no time can it be overinflated. Assuming that it requires 30 lbs/sq in to fill the tire, the value is so designed that the stem will start to rise at 25 lbs and stop at 30 lbs. The stem will only travel about $\frac{1}{4}"$ enough to be visually seen. At the point of rise (25 lbs) the pressure applied on outer valve in putting in air from outside source will not be strong enough to give a false gauge reading (as will be explained later). The $\frac{1}{4}"$ travel of stem to full inflation of the tire will be sufficient travel for the viewer.

It is another object of the invention to provide an improved tire valve stem system for positioning within the tire rim to provide a tire pressure maximum and safe minimum pressure indicator of improved reliability and readability.

It is another object to provide a system of the above type having low cost and simplicity of production.

It is a further object to provide a means of releasing air from a fully inflated tire so as to remove the tire from the rim when inner valve has air locked in.

Yet another object is to permit the inner valve to automatically open when air is lost therefrom. By having a hose connection to a $CO^2$ chamber, as the air is lost, the $CO^2$ will automatically replace the air (the inner valve will lock automatically when tire is full again). Thus at all times, all four tires will have full air pressure for best performance.

The above and yet another object and advantages of the present invention will become apparent in the hereinafter set forth in the Detailed Description of the invention, the Drawings and Claims appended herewith.

DETAILED DESCRIPTION OF THE INVENTION

Figure 1:
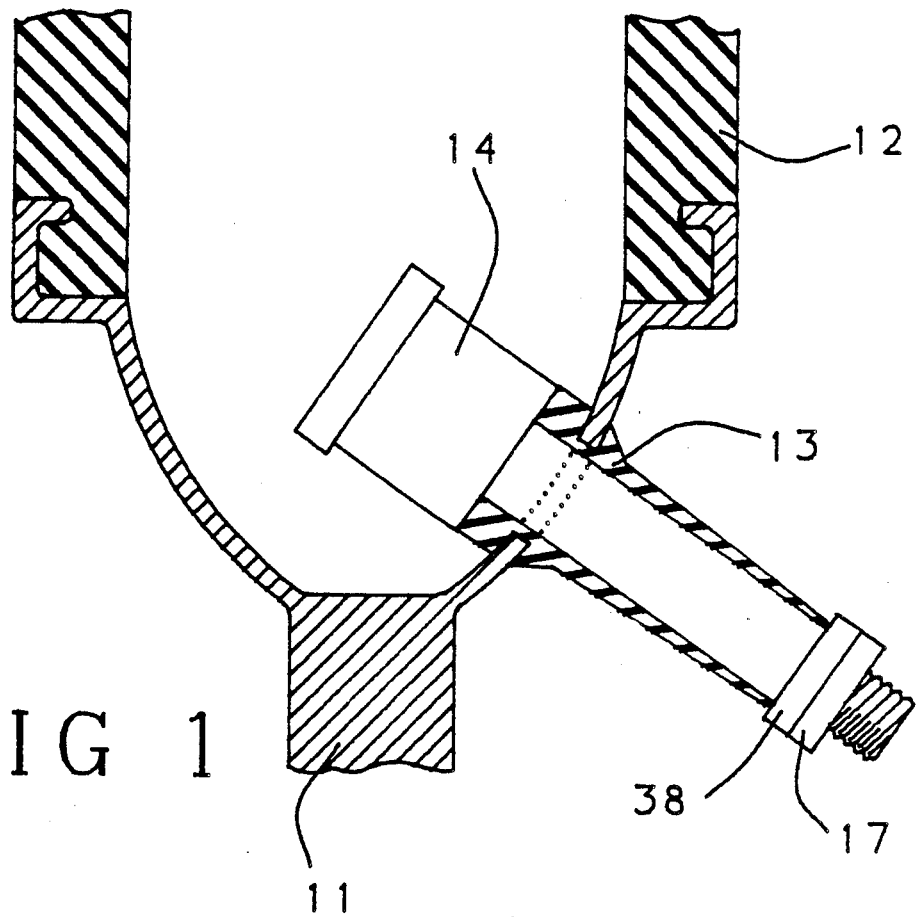
FIG. 1 is a cross-sectional view of a tire, tire rim and the inventive valve showing tire pressure at a low level.
Figure 2:
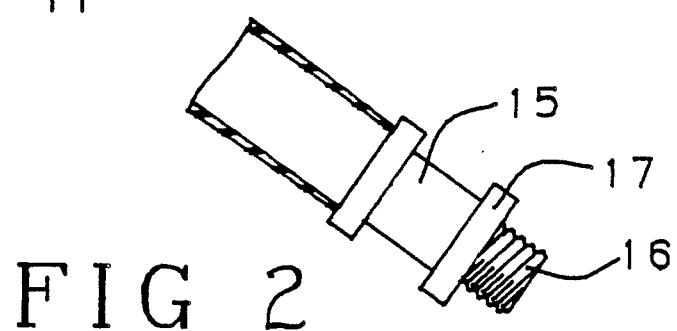
FIG. 2 is a fragmentary view of a portion of the inventive valve, showing tire pressure at a satisfactorily level.

With reference to the environmental view of FIG. 1 it may be seen that the present tire pressure indicator system is positioned within RIM 11 and connects integrally with rubber tire 12. Also shown in FIG. 1 is a base 14 (described later in detail) and a rubber exterior 13 which covers the components of the air pressure control system described below. FIG. 1 shows the tire with no pressure and full pressure indicated in FIG. 2 with stem 15 open. The distance is indicated by gauge stop 17.

Figure 3:
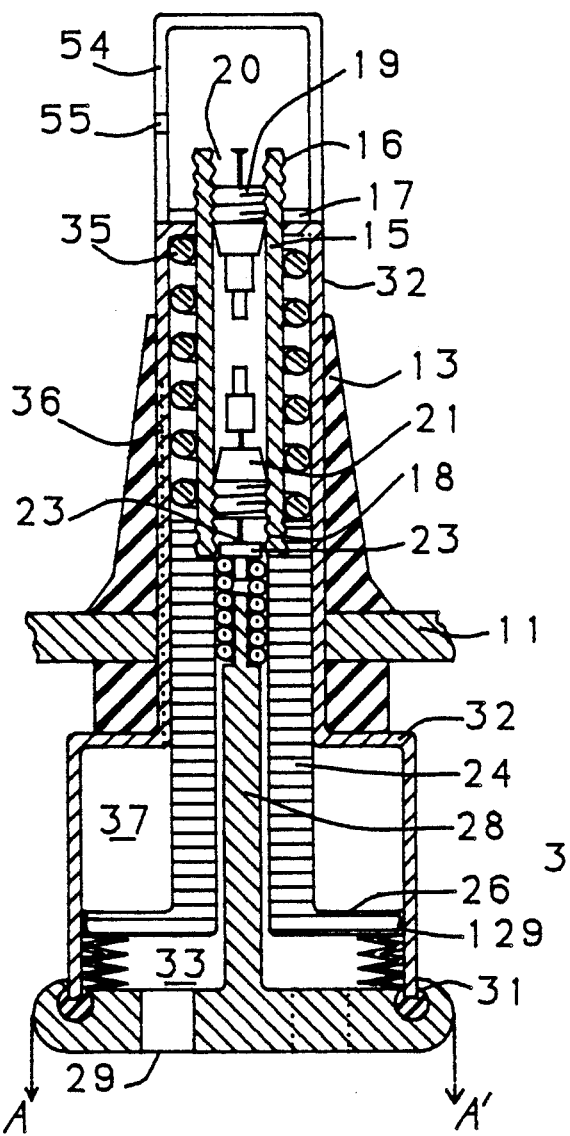
FIG. 3 is a longitudinal radial cross-section view of the inventive valve system showing low tire pressure.
Figure 4:
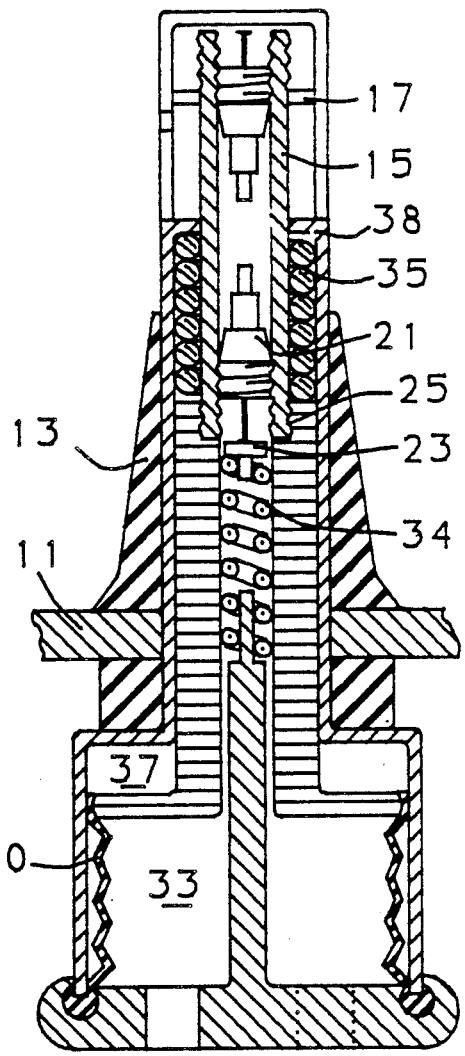
FIG. 4 is a view, similar to the views of FIG. 3, however, showing the tire filled to a desired level of pressure.

In the longitudinal radial cross-section views of FIG. 3 and 4 the present inventive tire pressure control system is seen to include hollow elongated axisymmetric stem 15 having an outer end in the area of thread 16 and an inner end in the area of stem threading seal 18. Said stem 15 includes said gauge stop 17 near said outer end of stem 15.

Further shown in FIG. 3 and 4 is said outer tire stem valve 19 secured within said outer end of said stem 15. Said outer tire stem valve 19 is normally open in the presence of pressure at its inlet 20 and normally closed in the absence of pressure.

On the lower end of stem 15 is said valve 21 having a longitudinal axis which is inverted relative to the axis of said outer tire stem valve 19. FIG. 3 shows that lower pin 22 of inner valve 21 is pressed when button 23 is pressed on lower pin 22 and FIG. 4 shows button 23 loses contact with lower pin 22 then valve is closed.

The inventive system includes hollow axisymmetric skirt 24 wich is characterized by a central longitudinal bore. Said skirt exhibits an outer end in the area of stem threading seal 25. A radial annular base area 26 and, as shown in FIG. 3, said stem 15 is secured in axial alignment with said skirt 24.

Also shown in the views of FIG. 3 and 4 is a axisymmetric hollow base assembly 27 which includes an axial base protrusion 28, apertures 29 in fluid communication with the inside of tire 12 radial base 27, interface 129 between portion 26 of skirt 24 and diaphragm 30, and interface 31 which, within a single connection, connects the bottom of diaphragm 30, radial base 31 of base assembly 27 and the innermost end of shell 32 (later described below in more detail) said diaphragm 30 is circumferential and is disposed at a radius from the axis of the base assembly 27. The assembly 27 is in fluid-tight relation with skirt 24 and the inner end of stem 15, as such, the air pressure within chamber 33 corresponds to the air pressure within tire 12.

With further references to the view of FIG. 3 and 4 there is shown an inner spring 34 having an inner end and an outer end, as may be noted, the inner end of spring 34 is positioned upon the outermost furface of the base assembly protrusion 28 and, thereby, upon the axis of said skirt 24 and stem 15.

As may be further noted, the outer end of said inner spring 34 is positioned against pin 22 to inner stem valve 21. In practice, usage may be of a button 23 to facilitate the contact between the outer end of inner spring 34 and inlet pin 22 of valve 21. This structure assures that the spring force of spring 34 will maintain inner stem valve 22 in an open condition for so long as any compression within inner spring 34 remains and that, when no compression within inner spring 34 remains (the condition shown in FIG. 4) no force will be applied by the spring 34 to inlet 22 of valve 21 and valve 21 will be closed.

With reference to the view of FIG. 4 it may be noted that when the tire pressure of the tire 12 reaches a level sufficient to compress outer spring 35 and thus expand inner spring 34 to a state of complete non-compression, e.g., 35 pounds/sq. in. of tire pressure, inner tire stem valve 21 will close, thereby preluding the entry of any further air through outer valve 19. The spring constant of spring 34 is selected in order to cause a complete expansion when exposed to pressure in the vicinity of 35 lbs/sq. in or to whatever the manufacturers requirements are. Note when the auto is driven in high speeds and the tire 12 heats up creating more pressure in the tire, the excessive pressure will keep the bottom vlave 21 closed. The gauge or stem 15 only goes down when threre is less pressure in tire 12. Therefore, the gauge should only be checked after the car is at rest for a time.

With further reference to the view of FIG. 3 shell 32 is seen to include a longitudinal vent 36 which provides atmospheric pressure equalization between region 37 against tire pressure set in regional area 33 of base assembly 26 and the annular region within which outer spring 35 is positioned. The annular base area 26 must have a large enough diameter to accept the required pressure to force spring 35 to collapse and the minimum dia size is 400" dia.

Figure 5:
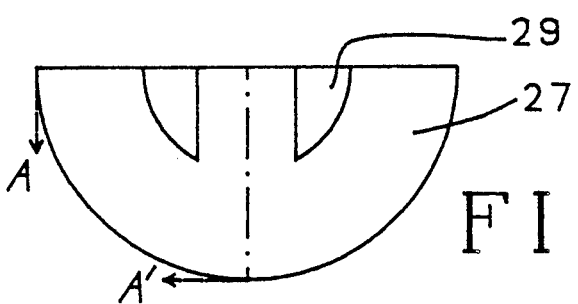
FIG. 5 is one-half, radial, cross-sectional view taken along line A—A of FIG. 3.

The view of FIG. 5 is bottom view of base 27 cross section, line A—A showing interface 29.

The system yet further includes an outer spring 35 having an inner and outer end, said inner end thereof being positioned upon skirt 24 (see FIG. 3). The outer end of said spring 35 urges against said outer radial stop 38 of shell 32.

The other spring 35 is made to the specifications of the tire 12 pressure requirements e.g., should the tire require 30 lbs/sq. in the spring 35 will fully compress at 30 lbs/sq. in. Then again should the tire require 36 lbs then 36 lbs will compress the spring.

As may be appreciated, the degree of compression of outer spring 35 increases as a direct function of the rate of increase of pressure within base assembly 14 and tire 12. Therefore, the degree of expansion of outer spring 35 is inversely related to the air pressure within base assembly 27 and tire 12. In this arrangement, when the outer spring 35 is substantially in expansion, skirt 24 will be in a lower position which, in turn, will bring stem 15 into a lower position, this corresponding substantially to the condition shown in FIG. 1 and 3. When such occurs, the user is thereby alerted to the fact that tire pressure has dropped to an unaccountably low level.

Figure 11:
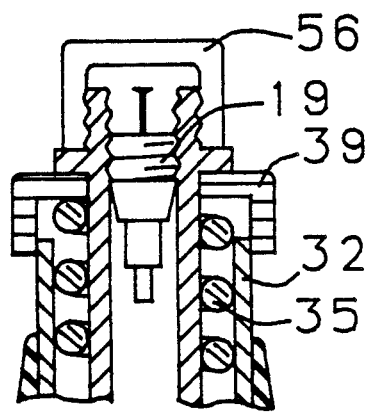
FIG. 11 is an enlarged view of the other end of the stem, shell, and outer tire stem valve, showing the setting of the valve at 30 lbs.
Figure 12:
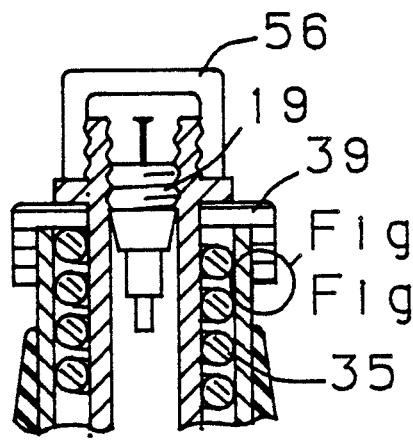
FIG. 12 is a view similar to the view of FIG. 11, however, without an outer radial element over the top of the shell of the system, showing the setting of the valve at 36 lbs.

Enlarged views of outer tire stem valve 19 elements are shown in FIG. 11 and 12. It may be seen that the system may be provided with a shell cap 39 as well as a stop lock 40 to control the operational spring constant of other spring 35. This is more full seen in views FIG. 12 and 13 in which there is shown said shell cap 39, a stop lock 40 (for controlling the axial position of shell cap 39 relative to shell 32), and spring pin 41 which operates as a fail safe for stop lock 40.

Figure 13:
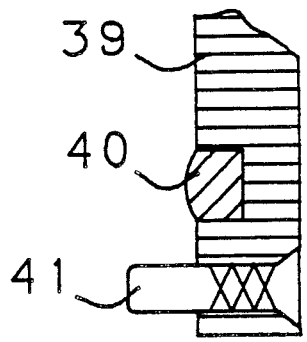
FIG. 13 is a cross-sectional fragmentary view taken through the spring pin of FIG. 11.
Figure 14:
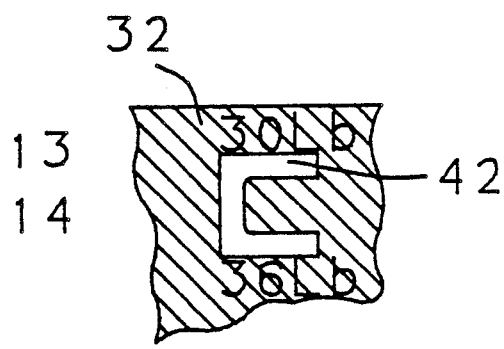
FIG. 14 is a side plan view of FIG. 12 showing an upper groove in the shell, showing a means for adjusting tire pressure.

In FIG. 13 and 14 there are shown two different positions for spring pin 41 which positions are defined by groove 42. More particularly, the lower part of groove 42 corresponds to a maximum pressure of 36 lbs, while the upper part of groove 42 corresponds to a pressure of 30 lbs. The standard tire valve may not require this adjustment. On new cars where the rear tires have different pressures from front tires and then require rotating tires, and the pressures have to be compensated, or in areas where excessive snow requires the tires to have less air pressure for better traction.

Figure 6:
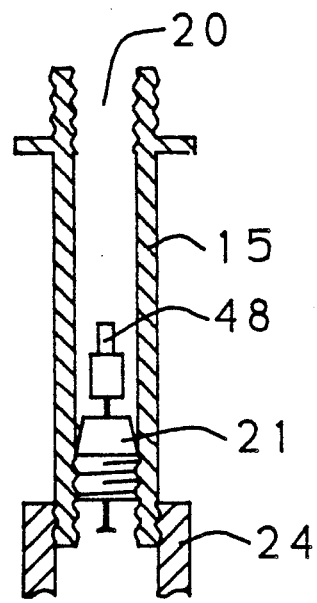
FIG. 6 show s a connection between the stem and skirt of the system, showing the inner valve locked, as is the case in the view of FIG. 4.
Figure 7:
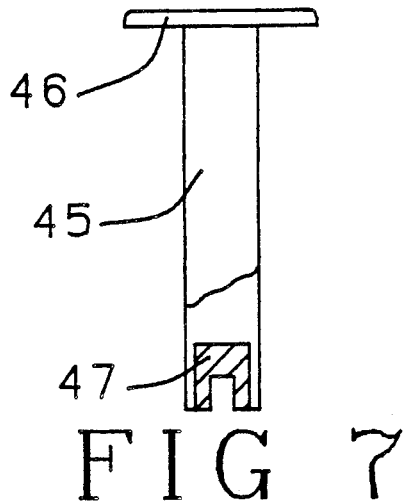
FIG. 7 is a view of a tool used for opening the inner tire stem valve when tire is full.
Figure 9:
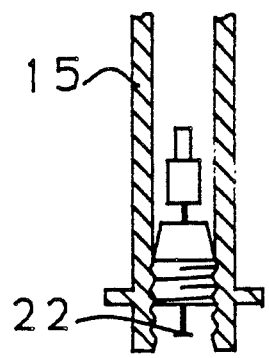
FIG. 9 is an enlarged view of the inner end of the stem.
Figure 8:
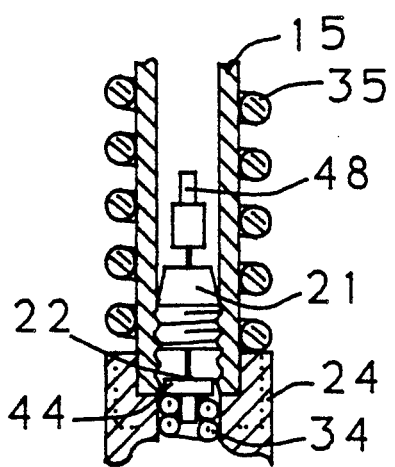
FIG. 8 is a longitudinal, fragmentary, cross-sectional view of stem-skirt interface in the area of the lower tire stem valve, showing an alternative means for opening the inner valve.
Figure 10:
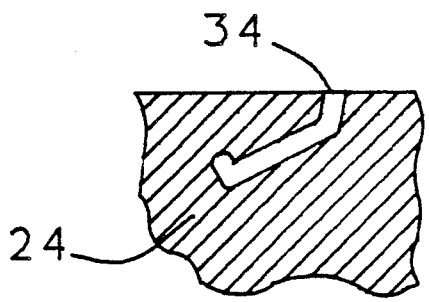
FIG. 10 is a side plan view of FIG. 8 showing a lower groove within the skirt.

The enlarged views of FIG. 8 to 10 show a means for adjusting the axial position of stem 15 relative to skirt 24 to thereby adjust the effective spring constant of inner spring 34 by rotation of stem 15 downwardly into groove in the direction of skirt 24. Said adjusting means comprise means for pressing in lower pin 22 of valve 21 to bottom 44 to open valve 21 and permit air to escape from the tire 12, when it is necessary to remove the tire from the rim. When tire is fully inflated the inner valve is locked and should you want to change the tire, you must remove the air to get it off the rim. FIG. 6 and 7 is an alternate means of opening valve 21 to release air from tire. FIG. 7 shows a tool 45 having a handle 46 and provided with a rubberized engagement portion 47. For engagement with inlet 20 to inner stem 48 on valve 21. Rubberized portion snaps on to stem 48 to lift up and open valve 21. By giving tool 45 a fast jerk, it will snap off stem 48.

Figure 15:
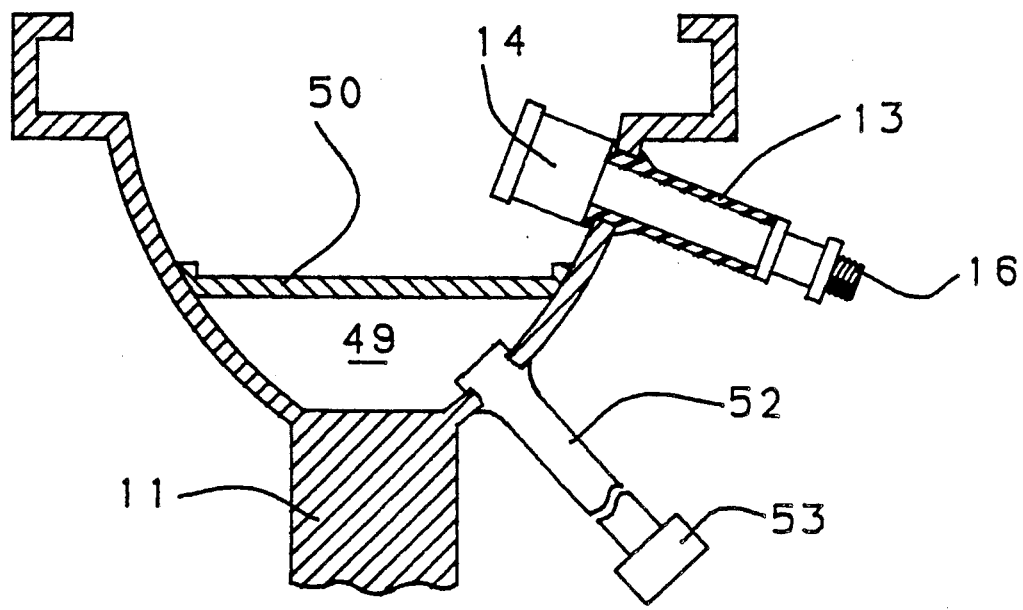
FIG. 15 is a radial cross-sectional view of a supplemental tire inflation element.
Figure 16:
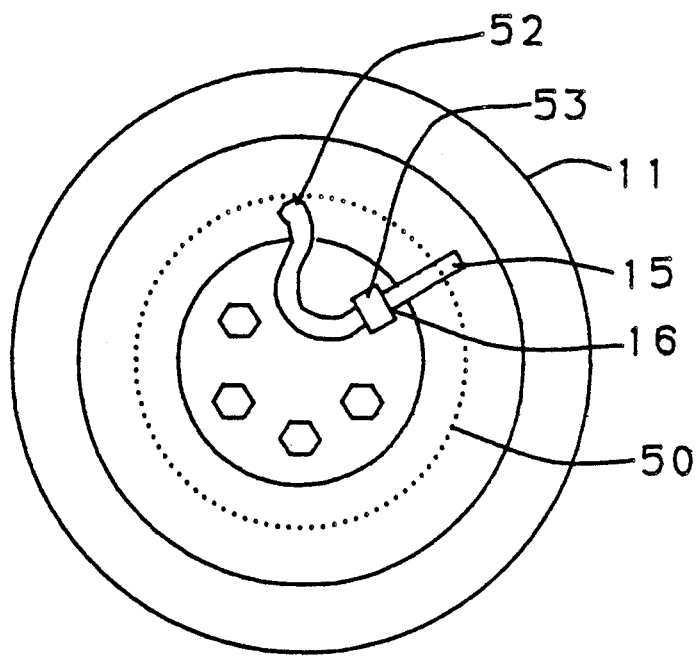
FIG. 16 is a side or outside view of FIG. 15.

With reference to the views of FIGS. 15 and 16 there is shown a supplement system which includes a pressurized gas chamber 49 positioned within wall 50 mounted within tire rim 30. Said chamber 49 is in communication through flexible conduit 52, to conduit coupling 53 which is connected to outer tire stem 15. The coupling 53 is screwed on to outer thread 16. The coupling 53 automatically opens the outer tire valve 19. When air pressure is lost in tire 12 and the inner valve 21 opens up, the pressurized gas stored in chamber 49 automatically fills the tire keeping at full pressure at all times. The chamber 49 in the lower portion of rim 30 is enclosed all around the rim circumference. Thus when balancing the tire with the high speed machine, the chamber will have no effect of offsetting wheel balance.

Thusly, there is provided a supplemental system which affords pressure equalization of the tire in the event of unwanted tire pressure loss. this can only occur with this new valve design and is an improtant feature in keeping tire fully inflated for best and safe performance.

FIG. 3 and 4 show a transparent cover 54 that can be used to keep the valve exposed section clean while 55 is an air vent. Also on FIG. 11 and 12 is another opaque cover 56 that is generally used on all standard cars today.

Accordingly, while there has been shown and described the preferred embodiment of the present invention, it is to be appreciated that the invention may be embodied otherwise than is herein specifically shown and described, and that within said embodiment, certain changes may be made in the details thereof without departing from the underlying principles of this invention within the scope of the claims appended herewith.

What is claimed is:

1. An improved pressure control valve assembly for a pressure valve, said assembly having a nipple sleeve portion and a base portion, the assembly comprising:
   (a) a niple barrel portion slideably within said nipple sleeve portion, said nipple barrel portion having a fore section and an aft section;
   (b) first and second stem valve means fluidly secured to said nipple barrel portion to permit flow of gas under pressure through said nipple barrel portion, said first stem valve means secured to said fore section, and said second stem valve means secured to said aft section in opposition to said first stem valve means;
   (c) compressable tensioning means for biasing said nipple barrel portion with respect to said nipple sleeve portion in response to pressure levels in the vicinity of the base portion; and
   (d) pressure sensitive biasing means fluidly attached to said base portion for biasing said second stem valve means in an open position until a predetermined pressure is reached in the vicinity of the base portion, said pressure sensitive biasing means comprising:
      (i) a stem base portion, connected to said base portion and extending towards said second stem valve means;
      (ii) a stem platform; and
      (iii) stem tensioning means for biasing said stem platform with respect to said stem portion and against said second stem valve means.

2. The improved pressure valve assembly as in claim 1, said nipple barrel portion including a tail section, said tail section providing guidance for said stem platform and said stem tensioning means.

3. The improved pressure valve assembly as in claim 2, said tail section including threading, said aft section of said stem barrel portion having threading mateable with said tail section providing adjustable tensioning of said stem tensioning means.

4. The improved pressure valve assembly as in claim 1, said fore section including
   an external seat portion, said external seat portion sized and proportioned to mate with an external coupler connected to a pressurized source.

5. The improved pressure valve assembly as in claim 4, said fore section including
   a nipple limiting means for buttressing said external seat portion against the nipple sleeve portion and in opposition to said compressible tensioning means.

6. The improved pressure valve assembly as in claim 4, said external seat poriton including threading for sealing engagement with an external coupler.

7. The improved pressure valve assembly as in claim 4, said improved pressure valve assembly further comprising an external pressurized gas source in fluid communication to said external seat portion in which said external pressurized gas source continuously provides additional gas quantities as permitted by said improved pressure valve assembly as leakage may occur.

8. The system as recited in claim 1 further comprising means for depressing a pin of said second stem valve means after removal of said first valve means to thereby permit selective release of air from a tire for the purposes of removal of the tire from a rim.

9. The system as recited in claim 8 in which said depressing means comprises key means.

10. The system as recited in claim 8 in which said depressing means comprises means for rotatable engagement of said second stem valve means.

11. An improved pressure valve assembly comprising
    a base portion for sealingly engaging an orifice of a receptacle,
    a stem portion,
    an extendable nipple portion,
    first and second self-closing valve means secured in opposition to the nipple portion for admitting a pre-determined tire pressure of fluid through the nipple portion to the receptacle,
    a first elongated extension on the nipple portion passing through the base portion,
    an elastometric portion connecting the first elongated extension to the base portion,
    first spring means coupled between the stem portion and the first elongated extension for yieldingly holding the nipple portion against the force of the tire pressure to control axial movement of the nipple portion with respect to the base portion in response to changes in tire pressure,
    indicator means attached to the nipple portion for providing an indication of tire pressure,
    a second elongated extension connected to the base portion and axially extending substantially within the first elongated extension, and,
    Second spring means couple between the second elongated extension, and a second valve stem for maintaining said valve stem in open position until a predetermined maximum tire pressure is obtained whereupon said valve stem closes to avoid over inflation.

* * * * *